(12) United States Patent
Hsieh (10) Patent No.: US 11,347,433 B2
(45) Date of Patent: May 31, 2022

(54) METHOD FOR PERFORMING SUDDEN POWER OFF RECOVERY MANAGEMENT, ASSOCIATED MEMORY DEVICE AND CONTROLLER THEREOF, AND ASSOCIATED ELECTRONIC DEVICE

(71) Applicant: Silicon Motion, Inc., Hsinchu County (TW)

(72) Inventor: Sung-Yen Hsieh, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 46 days.

(21) Appl. No.: 16/846,384

(22) Filed: Apr. 12, 2020

(65) Prior Publication Data
US 2020/0371716 A1   Nov. 26, 2020

(30) Foreign Application Priority Data
May 22, 2019   (TW) ................................. 108117590

(51) Int. Cl.
*G06F 3/06* (2006.01)
*G06F 1/30* (2006.01)

(52) U.S. Cl.
CPC .............. *G06F 3/0659* (2013.01); *G06F 1/30* (2013.01); *G06F 3/064* (2013.01); *G06F 3/0604* (2013.01); *G06F 3/0679* (2013.01)

(58) Field of Classification Search
CPC ...... G06F 3/0659; G06F 3/0604; G06F 3/064; G06F 3/0679; G06F 1/30
See application file for complete search history.

(56) References Cited

U.S. PATENT DOCUMENTS

| 9,213,627 B2 | 12/2015 | Van Acht | |
| 2015/0006939 A1* | 1/2015 | Lim | G11C 5/148 713/324 |
| 2015/0039948 A1* | 2/2015 | Um | G11C 29/82 714/710 |
| 2016/0246710 A1* | 8/2016 | Shimizu | G06F 3/0676 |
| 2019/0056887 A1* | 2/2019 | Park | G11C 16/10 |
| 2019/0146705 A1 | 5/2019 | Lin | |
| 2019/0371409 A1* | 12/2019 | Brandt | G11C 16/08 |
| 2020/0326853 A1* | 10/2020 | Lee | G06F 3/0673 |

* cited by examiner

*Primary Examiner* — Nanci N Wong
(74) *Attorney, Agent, or Firm* — Winston Hsu (57) ABSTRACT

A method for performing sudden power off recovery (SPOR) management, an associated memory device and a controller thereof, and an associated electronic device are provided. The method may include: triggering writing an expansion block; regarding a target block, setting a page count and a start page number for being processed with binary search; at least according to the page count and the start page number, performing the binary search on the target block to find a first empty page within the target block; performing page-by-page search, starting from the first empty page in a backward direction within the target block, to find the last valid page within the target block; determining an abandonment range within the expansion block according to the last valid page and the first empty page; and performing dummy programming on all expansion pages within the abandonment range.

9 Claims, 10 Drawing Sheets

| □ Valid | ▨ Valid but not stable | ▨ Damaged | □ Empty |
|---|---|---|---|
| FP#0 / XP#0 | FP#0 / XP#1 | FP#0 / XP#2 | FP#0 / XP#3 |
| FP#1 / XP#4 | FP#1 / XP#5 | FP#1 / XP#6 | FP#1 / XP#7 |
| FP#2 / XP#8 | FP#2 / XP#9 | FP#2 / XP#10 | FP#2 / XP#11 |
| FP#3 / XP#12 | FP#3 / XP#13 | FP#3 / XP#14 | FP#3 / XP#15 |
| FP#4 / XP#16 [S11] | FP#4 / XP#17 | FP#4 / XP#18 [S14] | FP#4 / XP#19 [S15] |
| FP#5 / XP#20 [S13] | FP#5 / XP#21 | FP#5 / XP#22 | FP#5 / XP#23 |
| FP#6 / XP#24 [S12] | FP#6 / XP#25 | FP#6 / XP#26 | FP#6 / XP#27 |
| FP#7 / XP#28 | FP#7 / XP#29 | FP#7 / XP#30 | FP#7 / XP#31 |

| | Valid | Valid but not stable | Damaged | Empty |
|---|---|---|---|---|
| | FP#0 / XP#0 | FP#0 / XP#1 | FP#0 / XP#2 | FP#0 / XP#3 |
| | FP#1 / XP#4 | FP#1 / XP#5 | FP#1 / XP#6 | FP#1 / XP#7 |
| | FP#2 / XP#8 | FP#2 / XP#9 | FP#2 / XP#10 | FP#2 / XP#11 |
| | FP#3 / XP#12 | FP#3 / XP#13 | FP#3 / XP#14 | FP#3 / XP#15 |
| | FP#4 / XP#16 (S18) | FP#4 / XP#17 (S17) | FP#4 / XP#18 (S16) | FP#4 / XP#19 (S15) |
| | FP#5 / XP#20 | FP#5 / XP#21 | FP#5 / XP#22 | FP#5 / XP#23 |
| | FP#6 / XP#24 | FP#6 / XP#25 | FP#6 / XP#26 | FP#6 / XP#27 |
| | FP#7 / XP#28 | FP#7 / XP#29 | FP#7 / XP#30 | FP#7 / XP#31 |

| | | | |
|---|---|---|---|
| FP#0 / XP#0 | FP#0 / XP#1 | FP#0 / XP#2 | FP#0 / XP#3 |
| FP#1 / XP#4 | FP#1 / XP#5 | FP#1 / XP#6 | FP#1 / XP#7 |
| FP#2 / XP#8 | FP#2 / XP#9 | FP#2 / XP#10 | FP#2 / XP#11 |
| FP#3 / XP#12 | FP#3 / XP#13 | FP#3 / XP#14 | FP#3 / XP#15 |
| FP#4 / XP#16 | FP#4 / XP#17 | FP#4 / XP#18 | FP#4 / XP#19 |
| FP#5 / XP#20 | FP#5 / XP#21 | FP#5 / XP#22 | FP#5 / XP#23 |
| FP#6 / XP#24 | FP#6 / XP#25 | FP#6 / XP#26 | FP#6 / XP#27 |
| FP#7 / XP#28 | FP#7 / XP#29 | FP#7 / XP#30 | FP#7 / XP#31 |

☐ Valid   ☒ Invalid and virtually-programmed   ☐ Empty

| Valid | Invalid and virtually-programmed | Empty |

| FP#0 / XP#0 | FP#0 / XP#1 | FP#0 / XP#2 | FP#0 / XP#3 |
|---|---|---|---|
| FP#1 / XP#4 | FP#1 / XP#5 | FP#1 / XP#6 | FP#1 / XP#7 |
| FP#2 / XP#8 | FP#2 / XP#9 | FP#2 / XP#10 | FP#2 / XP#11 |
| FP#3 / XP#12 | FP#3 / XP#13 | FP#3 / XP#14 | FP#3 / XP#15 |
| FP#4 / XP#16 | FP#4 / XP#17 | FP#4 / XP#18 | FP#4 / XP#19 |
| FP#5 / XP#20 | FP#5 / XP#21 | FP#5 / XP#22 | FP#5 / XP#23 |
| FP#6 / XP#24 | FP#6 / XP#25 | FP#6 / XP#26 | FP#6 / XP#27 |
| FP#7 / XP#28 | FP#7 / XP#29 | FP#7 / XP#30 | FP#7 / XP#31 |

METHOD FOR PERFORMING SUDDEN POWER OFF RECOVERY MANAGEMENT, ASSOCIATED MEMORY DEVICE AND CONTROLLER THEREOF, AND ASSOCIATED ELECTRONIC DEVICE

BACKGROUND OF THE INVENTION

1. Field of the Invention

The present invention relates to accessing of flash memories, and more particularly, to a method for performing sudden power off recovery (SPOR) management, an associated memory device and a controller thereof, and an associated electronic device.

2. Description of the Prior Art

Developments in flash memory technology have led to the wide application of portable or non-portable data storage devices. Examples include memory cards conforming to SD/MMC, CF, MS, XD or UFS specifications, solid-state drives, and embedded storage devices conforming to UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually arranged to have some management mechanisms to properly manage internal operations thereof.

According to related art techniques, even a memory device with any of the above management mechanisms is still not good enough. For example, since the capacity of a flash memory varies with change of some specifications, the management mechanisms of these memory devices regarding sudden power off (SPO) events need more time to perform associated operations, resulting in long booting time or higher possibility of booting failure. Hence, there is a need for a novel method and associated architecture to achieve the goal of implementing a large-capacity memory device that can operate smoothly without introducing a side effect or in a way less likely to introduce a side effect.

SUMMARY OF THE INVENTION

An objective of the present invention is to provide a method for performing sudden power off recovery (SPOR) management, an associated memory device and a controller thereof, and an associated electronic device, to solve the aforementioned problem.

Another objective of the present invention is to provide a method for performing sudden power off recovery (SPOR) management, an associated memory device and a controller thereof, and an associated electronic device, to achieve the goal of implementing a large-capacity memory device that can operate smoothly without introducing a side effect or in a way less likely to introduce a side effect.

At least one embodiment of the present invention provides a method for performing sudden power off recovery (SPOR) management. The method is applied to a memory device, and comprises a non-volatile (NV) memory. The NV memory comprises at least one NV memory element. The method comprises: triggering writing an expansion block, wherein the memory device associates multiple physical blocks within a plurality of blocks of the at least one NV memory element with each other to form the expansion block, wherein during writing the expansion block, a sudden power off (SPO) event occurs, and the memory device is powered on again; regarding a target block, setting a page count and a start page number for being processed with binary search; at least according to the page count and the start page number, performing the binary search on the target block to find a first empty page within the target block; regarding the target block, checking whether an abandonment condition is satisfied, or whether the target block is full or empty; in response to the abandonment condition being not satisfied and the target block being neither full nor empty, performing page-by-page search, starting from the first empty page in a backward direction within the target block, to find a last valid page within the target block; determining an abandonment range within the expansion block according to the last valid page and the first empty page; and performing dummy programming on all expansion pages within the abandonment range.

At least one embodiment of the present invention provides a memory device which comprises an NV memory and a controller. The NV memory is arranged to store information, wherein the NV memory comprises at least one NV memory element. The controller is coupled to the NV memory, and is arranged to control operations of the memory device, wherein the controller comprises a processing circuit. The processing circuit is arranged to control the controller according to a plurality of host commands from a host device, to allow the host device to access the NV memory via the controller. The controller triggers writing an expansion block, and the controller associates multiple physical blocks within a plurality of blocks of the at least one NV memory element with each other to form the expansion block, wherein during writing the expansion block, a sudden power off (SPO) event occurs, and the memory device is powered on again. Regarding a target block, the controller sets a page count and a start page number for being processed with binary search. At least according to the page count and the start page number, the controller performs the binary search on the target block to find a first empty page within the target block. Regarding the target block, the controller checks whether an abandonment condition is satisfied or whether the target block is full or empty. In response to the abandonment condition being not satisfied and the target block being neither full nor empty, the controller performs page-by-page search, starting from the first empty page in a backward direction within the target block, to find the last valid page within the target block. The controller determines an abandonment range within the expansion block according to the last valid page and the first empty page. The controller performs dummy programming on all expansion pages within the abandonment range.

According to some embodiments, the present invention further provides an electronic device that comprises the aforementioned memory device, wherein the electronic device comprises the host device, and the host device and the memory device are coupled to each other. For example, the host device may comprise: at least one processor, arranged to control operations of the host device; and a power supply circuit, coupled to the at least one processor, and arranged to provide power to the at least one processor and the memory device. The memory device provides storage space to the host device.

At least one embodiment of the present invention provides a controller of a memory device, wherein the memory device comprises the controller and an NV memory, and the NV memory comprises at least one NV memory element.

The controller may comprise a processing circuit, and the processing circuit may control the controller according to a plurality of host commands from a host device, to allow the host device to access the NV memory via the controller. For example, the controller triggers writing an expansion block, and the controller associates multiple physical blocks within a plurality of blocks of the at least one NV memory element with each other to form the expansion block, wherein during writing the expansion block, a sudden power off (SPO) event occurs, and the memory device is powered on again. Regarding a target block, the controller sets a page count and a start page number for being processed with binary search. At least according to the page count and the start page number, the controller performs the binary search on the target block to find a first empty page within the target block. Regarding the target block, the controller checks whether an abandonment condition is satisfied, or whether the target block is full or empty. In response to the abandonment condition being not satisfied and the target block being neither full nor empty, the controller performs page-by-page search, starting from the first empty page in a backward direction within the target block, to find a last valid page within the target block. The controller determines an abandonment range within the expansion block according to the last valid page and the first empty page. The controller performs dummy programming on all expansion pages within the abandonment range.

An advantage provided by the present invention is that the present invention can perform proper control regarding operations of the controller, and more particularly, can achieve the goal of implementing a large-capacity memory device that can operate smoothly. When SOP events occur, the mechanism can smoothly operate with the aid of the high efficient power off recovery of the controller, thus making the memory device quickly become available for the user. Further, the implementation of the embodiments of the present invention does not increase additional cost significantly. Hence, the related art problems can be properly solved without increasing the overall cost significantly. Compared with the related art, the present invention can achieve the optimal performance of a memory device without introducing a side effect or in a way less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
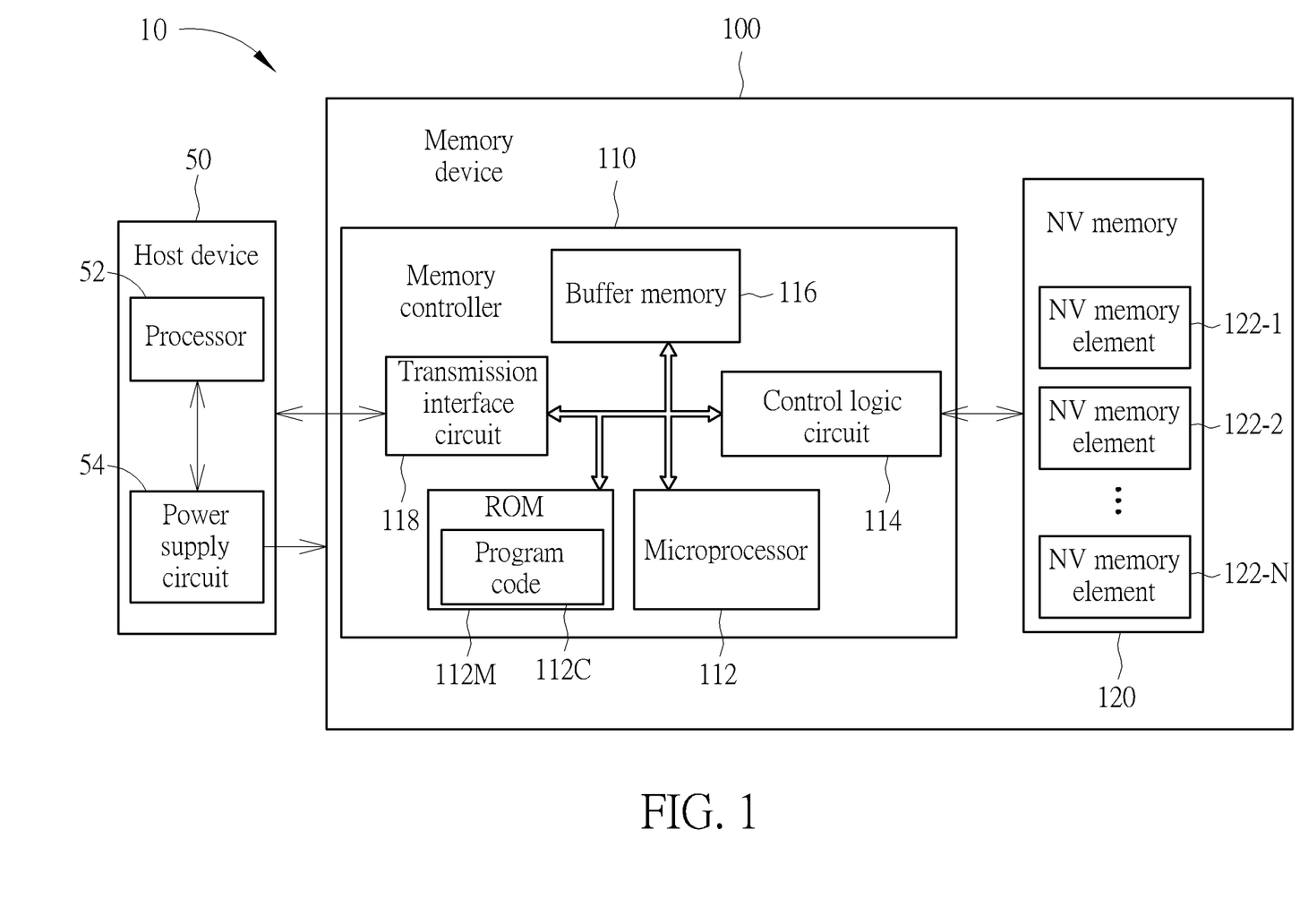
FIG. 1 is a diagram of an electronic device according to an embodiment of the present invention, wherein the electronic device comprises a host device and a memory device.

FIG. 1 is a diagram of an electronic device 10 according to an embodiment of the present invention, wherein the electronic device 10 may comprise a host device 50 and a memory device 100, and the memory device 100 may be arranged to store information for the host device 50. According to this embodiment, the memory device 100 may provide storage space for the host device 50, and may obtain one or more driving voltages from the host device 50 as the supply power for the memory device 100, but the present invention is not limited thereto. The host device 50 may comprise: at least one processor (e.g. one or more processors) which may be collectively referred to as the processor 52, and associated circuits such as a random access memory (RAM), bus, etc.; and a power supply circuit 54, wherein the processor 52 and the power supply circuit 54 are coupled to each other. The processor 52 may be arranged to control operations of the host device 50, and the power supply circuit 54 may provide power to the processor 52 and the memory device 100. Examples of the host device 50 may include, but are not limited to: multifunctional mobile phones, tablets, wearable devices and personal computers (e.g. desktop and laptop computers).

According to this embodiment, the memory device 100 may comprise a controller such as the memory controller 110, and may further comprise a non-volatile (NV) memory 120, wherein the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, . . . and 122-N, wherein the symbol "N" may represent an integer greater than 1. For example, the NV memory 120 may be a flash memory, and the NV memory elements 122-1, 122-2, . . . and 122-N may be a plurality of flash memory chips or a plurality of flash memory dies, respectively, but the present invention is not limited thereto. Examples of the memory device 100 may include, but are not limited to: a portable memory device (such as a memory card conforming to the SD/MMC, CF, MS, XD or UFS specification), a solid state drive (SSD) and various embedded storage device (such as an embedded storage device conforming to the UFS or EMMC specification).

As shown in FIG. 1, the memory controller 110 may comprise a processing circuit such as a microprocessor 112, a storage such as a read only memory (ROM) 112M, a control logic circuit 114, a buffer memory 116 and a transmission interface circuit 118, wherein at least one portion (e.g. a portion or all) of these elements may be coupled to each other via a bus. The buffer memory 116 is implemented with a random access memory (RAM), for example, a static RAM (SRAM), wherein the RAM may be arranged to provide internal storage space for the memory controller 110, for example, may temporarily store data for the memory controller 110, but the present invention is not limited thereto. Further, the ROM 112M in this embodiment is arranged to store a program code 112C, and the microprocessor 1120 is arranged to execute the program code 112C to control the access of the NV memory 120. Please note that the program code 112C may also be stored in the buffer memory 116 or any form of memory. The control logic circuit 114 may control the NV memory 120, and may comprise an error correction code (ECC) circuit (not shown), to protect data and/or perform error correction. The transmission interface circuit 118 may conform to a specific communications specification (such as the Serial Advanced Technology Attachment (SATA) specification, Universal Serial Bus (USB) specification, Peripheral Component Interconnect Express (PCIe) specification, embedded MultiMedia Card (eMMC) specification, or Universal Flash Storage (UFS) specification), and may perform communications according to the specific communications specification.

In this embodiment, the host device 50 may access the NV memory 120 within the memory device 100 via transmitting a plurality of host commands and the corresponding logical addresses to the memory controller 110. The memory controller 110 receives the plurality of host commands and the aforementioned corresponding logical addresses, translates the plurality of host commands into memory operating commands (hereinafter "operating commands") respectively, and uses the operating command to control the NV memory 120 to perform reading and writing/programming on memory units of some physical addresses within the NV memory 120, wherein the physical addresses may be associated with the logical addresses. More particularly, the memory controller 110 may generate or update at least one logical-to-physical address mapping table (referred to as "H2F table" for brevity) to manage the relationships between the physical addresses and the logical addresses, but the present invention is not limited thereto. For example, the respective relative locations of multiple fields in the aforementioned at least one H2F table may correspond to the logical addresses, and the multiple fields may respectively record the physical addresses to indicate the relationships between the physical addresses and the logical addresses, wherein in the beginning of creating the aforementioned at least one H2F table, each field of the multiple fields may equal to a default value such as 0xFFFFFFFF, and the default value will not equal to any valid physical address. Preferably, the aforementioned at least one H2F table may be implemented as at least one page address linking table, for controlling the access of respective pages of a plurality of blocks of the NV memory elements 122-1, 122-2, . . . and 122-N within the NV memory 120. The microprocessor 112 may create a global page address linking table according to multiple local page address linking tables, to record or update the relationships between the physical addresses and the logical addresses.

For example, in the NV memory 120, any NV memory element 122-*n* within the NV memory elements 122-1, 122-2, . . . and 122-N may comprise multiple blocks (e.g. the symbol "n" may represent any integer within [1, N]), and a block within the multiple blocks may comprise/record a specific number of pages. Under a situation where a physical address comprises a block address (such as a block number) and a page address (such as a page number), the memory controller 110 may access a certain page in a certain block of the NV memory 120 according to the block number and the page number.

In another example, the aforementioned any NV memory element 122-*n* may comprise multiple planes, a plane among the multiple planes may comprise a set of blocks such as the aforementioned multiple blocks, and a block within the set of blocks may comprise and record a specific number of pages. Under a situation where a physical address comprises a plane number, a block number and a page number, the memory controller 110 may access a certain page in a certain block of a certain plane of the NV memory 120 according to the plane number, the block number and the page number, but the present invention is not limited thereto. In the multi-plane architecture, the total block number may increase, and the storage capacity of the NV memory 120 may become larger.

Based on the architecture of the NV memory 120, the minimum unit for the memory controller 110 to perform operations of erasing data on the NV memory 120 may be a block, and the minimum unit for the memory controller 110 to perform operations of writing data on the NV memory 120 may be a page, but the present invention is not limited thereto. As there are the difference between the respective minimum units of the above operations, the memory controller 110 may be designed to have various management mechanisms, to ensure that the memory device 100 can operate correctly.

Regarding manufacturing the NV memory 120, there are multiple types of techniques available, such as: the 2D/planar NAND flash technique that arranges memory cells into a single layer of memory cells; and the 3D NAND flash technique that arranges memory cells into multiple layers of memory cells that are vertically stacked. For example, the NV memory 120 may be implemented to have a planar NAND flash architecture with a single layer of memory cells. In another example, the NV memory 120 may be implemented to have a 3D NAND flash architecture with multiple vertically stacked layers of memory cells. In this case, the storage capacity of the NV memory 120 may be extremely large.

Figure 2:
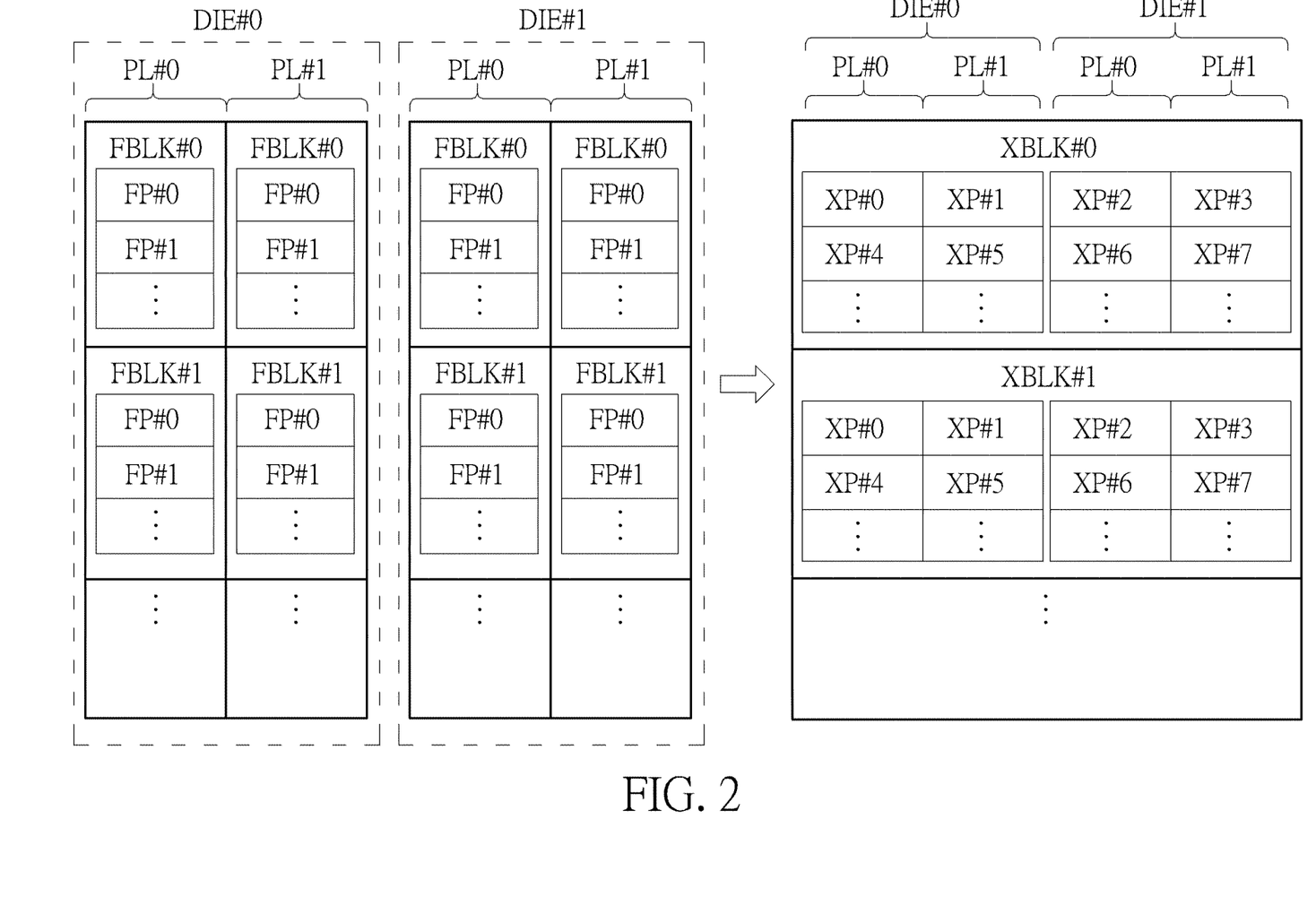
FIG. 2 illustrates an expansion control scheme according to an embodiment of the present invention.

In comparison with reading data from the NV memory 120, writing (more particularly, programming) data into the NV memory 120 may be much more time-consuming and power-consuming. FIG. 2 illustrates an expansion control scheme according to an embodiment of the present invention. The memory controller 110 may associate multiple sets of physical blocks respectively belonging to respective different planes of multiple different chips with each other to form a set of expansion blocks, to increase the accessing speed of the NV memory 120 through one or more parallel processing such as pipelining, interleaving, etc. For better comprehension, taking flash dies of dual-plane architecture as examples of two NV memory elements within the aforementioned NV memory elements 122-1, 122-2, . . . and 122-N, the memory controller 110 may associate four sets of physical blocks {{FBLK #0, FBLK #1, . . . }, {FBLK #0, FBLK #1, . . . }, {FBLK #0, FBLK #1, . . . }, {FBLK #0, FBLK #1, . . . }} respectively belonging to respective planes PL #0 and PL #1 of the dies DIE #0 and DIE #1 with each other to form a set of expansion blocks {XBLK #0, XBLK #1, . . . }, but the present invention is not limited thereto. According to this embodiment, the expansion pages XP #0, XP #1, XP #2 and XP #3 within the expansion block XBLK #0 represent the respective physical pages FP #0 of the four physical blocks FBLK #0 respectively belonging to the respective planes PL #0 and PL #1 of the dies DIE #0 and DIE #1, the expansion pages XP #4, XP #5, XP #6 and XP #7 within the expansion block XBLK #0 represent the respective physical pages FP #1 of the four physical blocks FBLK #0 respectively belonging to the respective planes PL #0 and PL #1 of the dies DIE #0 and DIE #1, and the rest may be deduced by analogy; the expansion pages XP #0, XP #1, XP #2 and XP #3 within the expansion block XBLK #1 represent the respective physical pages FP #0 of the four physical blocks FBLK #1 respectively belonging to the respective plane PL #0 and PL #1 of the dies DIE #0 and DIE #1, the expansion pages XP #4, XP #5, XP #6 and XP #7 within the expansion block XBLK #1 represent the respective physical pages FP #1 of the four physical blocks FBLK #1 respectively belonging to the respective planes PL #0 and PL #1 of the dies DIE #0 and DIE #1, and the rest may be deduced by analogy; and the rest (e.g. the meanings of the respective expansion pages of the subsequent expansion blocks) may be deduced by analogy. In addition, in each expansion block among the set of expansion blocks {XBLK #0, XBLK #1, ... }, the combination of the expansion pages XP #0, XP #1, XP #2 and XP #3 may be regarded as the first super page within the expansion block, the combination of the expansion pages XP #4, XP #5, XP #6 and XP #7 may be regarded as the second super page within the expansion block, and the rest may be deduced by analogy.

For better comprehension, each of the plurality of blocks (e.g. each physical block within the four sets of physical blocks {{FBLK #0, FBLK #1, ... }, {FBLK #0, FBLK #1, ... }, {FBLK #0, FBLK #1, ... } and {FBLK #0, FBLK #1, ... }}) may comprise Nfp physical pages such as the physical pages FP #0, FP #1, ... and FP # (Nfp−1), and each expansion block within the set of expansion blocks {XBLK #0, XBLK #1, ... } may comprise Nxp expansion pages such as the expansion pages XP #0, XP #1, ... and XP # (Nxp−1), wherein the symbols "Nfp" and "Nxp" may represent integers. For example, in the expansion control scheme shown in FIG. 2, Nxp=(4*Nfp), but the present invention is not limited thereto.

During writing an expansion block (e.g. a certain expansion block within the set of expansion blocks {XBLK #0, XBLK #1, ... }), when a SPO event occurs, all of the current operations are forced to stop. For better comprehension, a situation of lacking a proper recovery mechanism is assumed. In this situation, this expansion block and the data therein may become unusable, and the previously executed writing operations may be forced to be executed again, which is timing consuming to the user (e.g. when a large amount of data has been written into this expansion block). Hence, how to quickly resume the interrupted tasks after the SPO event to provide services for the user has become an important issue in this field.

At least one embodiment of the present invention discloses a method for performing sudden power off recovery (SPOR) management. This method may be applied to the memory device 100, and may be executed by the memory controller 110 of the memory device 100, and more particularly, may quickly resume the interrupted tasks to continue serving the user, for example, through the high efficacy workflow 200 thereof as shown in FIG. 3.

In Step 202, the memory controller 110 starts moving data (e.g. the user data) to an expansion block, such as a certain expansion block within the set of expansion blocks {XBLK #0, XBLK #1, ... }. When the memory controller 110 writes a certain set of page data within the data (e.g. a page of data in the user data) into a certain expansion page of the expansion block, the memory controller 110 may write this set of page data into a data region within a certain physical page represented by the expansion page, and record the logical address information of this set of page data in a spare region within the physical page, wherein the logical address information comprises a logical address such as a logical page number.

Figure 3:
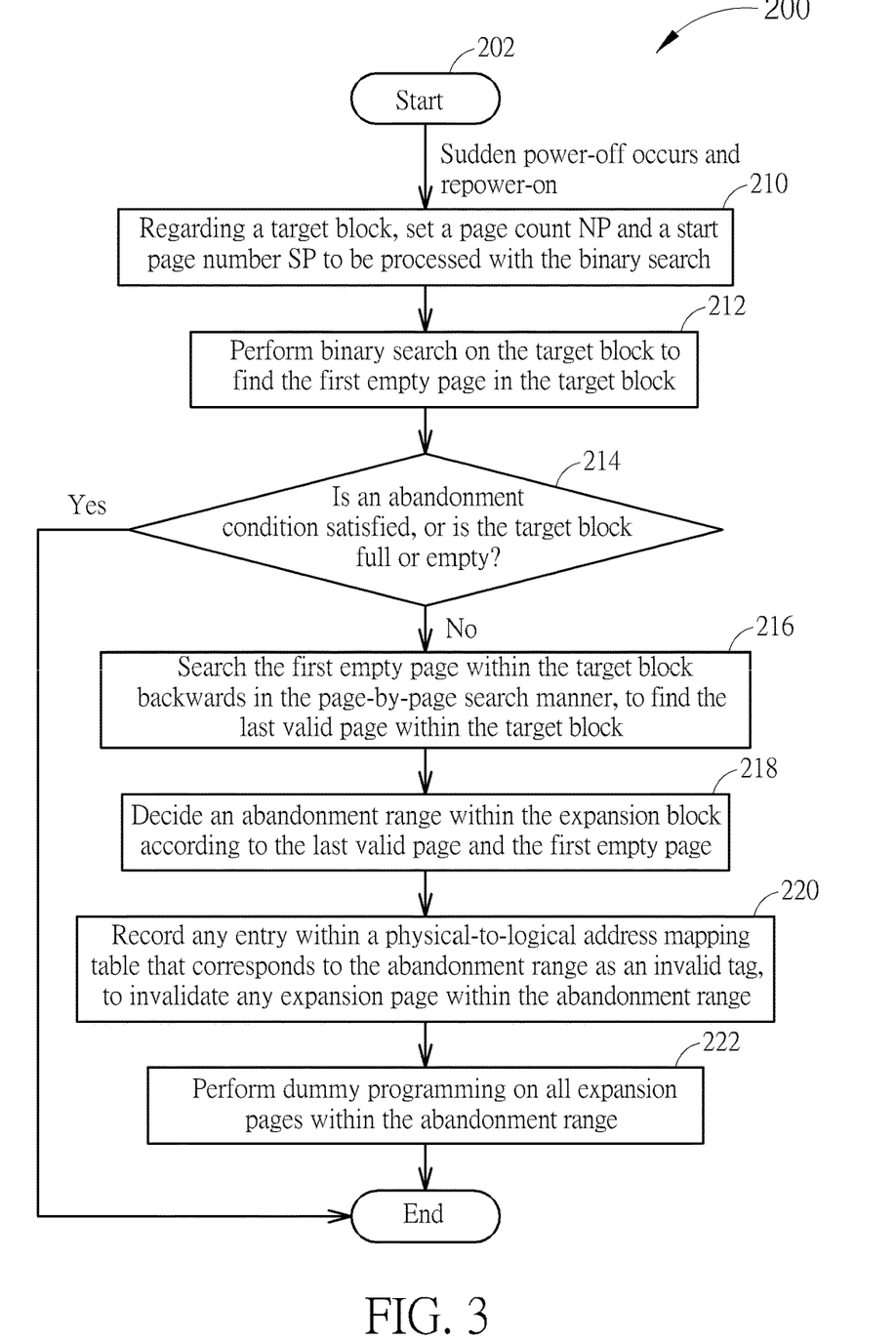
FIG. 3 illustrates a workflow of a method for performing sudden power off recovery (SPOR) management according to an embodiment of the present invention.

According to this embodiment, the memory controller 110 may trigger writing the expansion block in Step 202, wherein during writing the expansion block, an SPO event occurs and then the memory device 100 is powered on again (labeled "SPO and then Re-power on" in FIG. 3, for brevity).

In Step 210, regarding a target block, the memory controller 110 may set a page count NP and a start page number SP for being processed with the binary search, wherein the page count NP and the start page number SP belong to parameters of the binary search.

In Step 212, according to the parameter of the binary search, such as the page count NP and the start page number SP, the memory controller 110 may perform the binary search on the target block to find the first empty page within the target block. According to this embodiment, since any data that has been written into the target block (e.g. the user data) was written subsequently into the target block starting from the very beginning of the target block, the range starting from the very beginning of the target block to that of the first empty page of the target block is occupied rather than empty, while the range starting from the first empty page to the last writable portion (e.g. the last portion into which data such as user data can be written) in the target block is not written and remains empty. Through the binary search, the memory controller 110 may find the first empty page as soon as possible.

In Step 214, regarding the target block, the memory controller 110 may check whether an abandonment condition is satisfied or whether the target block is full or empty. The memory controller 110 may perform this checking operation according to the first empty page and at least one threshold (e.g. one or more thresholds). For example, the memory controller 110 may determine whether the abandonment condition is satisfied according to whether the page number of the first empty page within the target block is less than a first threshold, wherein: if the page number of the first empty page is less than the first threshold (which may indicate that the data amount of the data that has been written into the expansion block is very small), the memory controller 110 may determine that the abandonment condition is satisfied; otherwise, the memory controller 110 may determine that the abandonment condition is not satisfied; but the present invention is not limited thereto. In another example, when the first empty page is the first page within the target block, the memory controller 110 may determine that the target block is empty. In yet another example, when the first empty page is not found, the memory controller 110 may determine that the target block is full. If the abandonment condition is satisfied, or the target block is full or empty, the workflow 200 ends; otherwise, Step 216 is executed.

In Step 216, in response to the abandonment condition being not satisfied and the target block being neither full nor empty, the memory controller 110 may perform page-by-page search, starting from the first empty page in a backward direction within the target block, to find the last valid page within the target block, wherein performing the backward page-by-page search may comprise: perform the page-by-page searching along the backward direction such as the direction in which the page number decreases. For example, during performing the page-by-page search, no uncorrectable ECC (UECC) error occurs when the memory controller 110 reads a certain page. In this situation, the memory controller 110 may determine this page to be the last valid page.

In Step 218, the memory controller 110 may determine an abandonment range within the expansion block according to the last valid page and the first empty page. For example, the abandonment range may comprise (nxp2−nxp1) expansion pages such as the expansion pages XP #(nxp1+1), XP #(nxpb+2), . . . and XP #nxp2, wherein the symbols "nxp1" and "nxp2" may represent integers within the interval [0, (Nxp−1)], and nxp1<nxp2. The (nxp2−nxp1) expansion pages within the abandonment range may comprise expansion pages impacted (e.g. damaged) by the SPO event.

In Step 220, the memory controller 110 may record any entry within a physical-to-logical address mapping table (F2H table) that corresponds to the abandonment range (i.e. any entry corresponding to the abandonment range in the F2H table) as an invalid tag such as 0xFFFFFFFF, to invalidate any expansion page within the abandonment range. For example, when writing a set of data (e.g. the user data) into a physical page, the memory controller 110 may record a logical address of the set of data within the F2H table to be an entry corresponding to the physical page, to indicate that the set of data of this physical page corresponds to (e.g. is associated with or stored at) this logical address, but the present invention is not limited thereto. Since the invalid tag such as 0xFFFFFFFF will not equal to any valid logical address, the memory controller 110 may record a certain entry within the F2H table as the invalid tag to invalidate a corresponding expansion page.

In Step 222, the memory controller 110 may perform dummy programming on all expansion pages within the abandonment range, and more particularly, may program dummy data such as non-user data into these expansion pages, to make these expansion pages impacted by the SPO event become more stable. The memory controller 110 may update the F2H table for the expansion block to make the expansion block become available for further use (which means the memory controller 110 has completed SPOR). More particularly, the memory controller 110 may read the respective spare regions of the expansion pages XP #nxp1, XP #(nxp1−1), XP #(nxp1−2), . . . and XP #0 one by one along the direction in which the expansion page number decreases, starting from the last expansion page XP #nxp1 before the abandonment range within the expansion block, to extract the logical addresses such as the logical page numbers from the logical address information that has been recorded in these spare regions by the memory controller 110 in Step 202, for updating the F2H table. For example, the memory controller 110 may record these logical addresses such as these logical page numbers in the F2H table until remedying the recording of the portion that has not been updated in the F2H table is completed. Afterward, the workflow 200 ends.

For better comprehension, the method may be illustrated by the workflow 200 shown in FIG. 3, but the present invention is not limited thereto. According to some embodiments, one or more steps may be added, deleted or changed in the workflow 200 shown in FIG. 3.

For better comprehension, according to some embodiments in the following, assume that the expansion block mentioned in Step 202 may comprise the expansion pages XP #0, XP #1, XP #2, XP #3, XP #4, XP #5, XP #6, XP #7, XP #8, XP #9, XP #10, XP #11, XP #12, XP #13, XP #14, XP #15, XP #16, XP #17, XP #18, XP #19, XP #20, XP #21, XP #22, XP #23, XP #24, XP #25, XP #26, XP #27, XP #28, XP #29, XP #30 and XP #31, and each physical block within four corresponding physical blocks that are associated with one another to form this expansion block may comprise physical pages FP #0, FP #1, FP #2, FP #3, FP #4, FP #5, FP #6 and FP #7, but the present invention is not limited thereto. For example, the expansion pages XP #0, XP #1, . . . and XP #15 have been successfully programmed and may be regarded as valid pages, wherein the data therein is not damaged. Afterward, the memory controller 110 triggers writing or programming the expansion pages XP #16, XP #17, XP #18 and XP #19, but the occurrence of SPO event makes the expansion page XP #16 be a valid but unstable page and makes the expansion pages XP #17 and XP #18 be damaged pages, while the expansion pages XP #19, XP #20, . . . and XP #31 remain empty (which means these pages are empty pages). Based on the method, the memory controller 110 may properly select a block as the target block, to quickly resume the interrupted task to continue providing services for the user.

Figure 4:
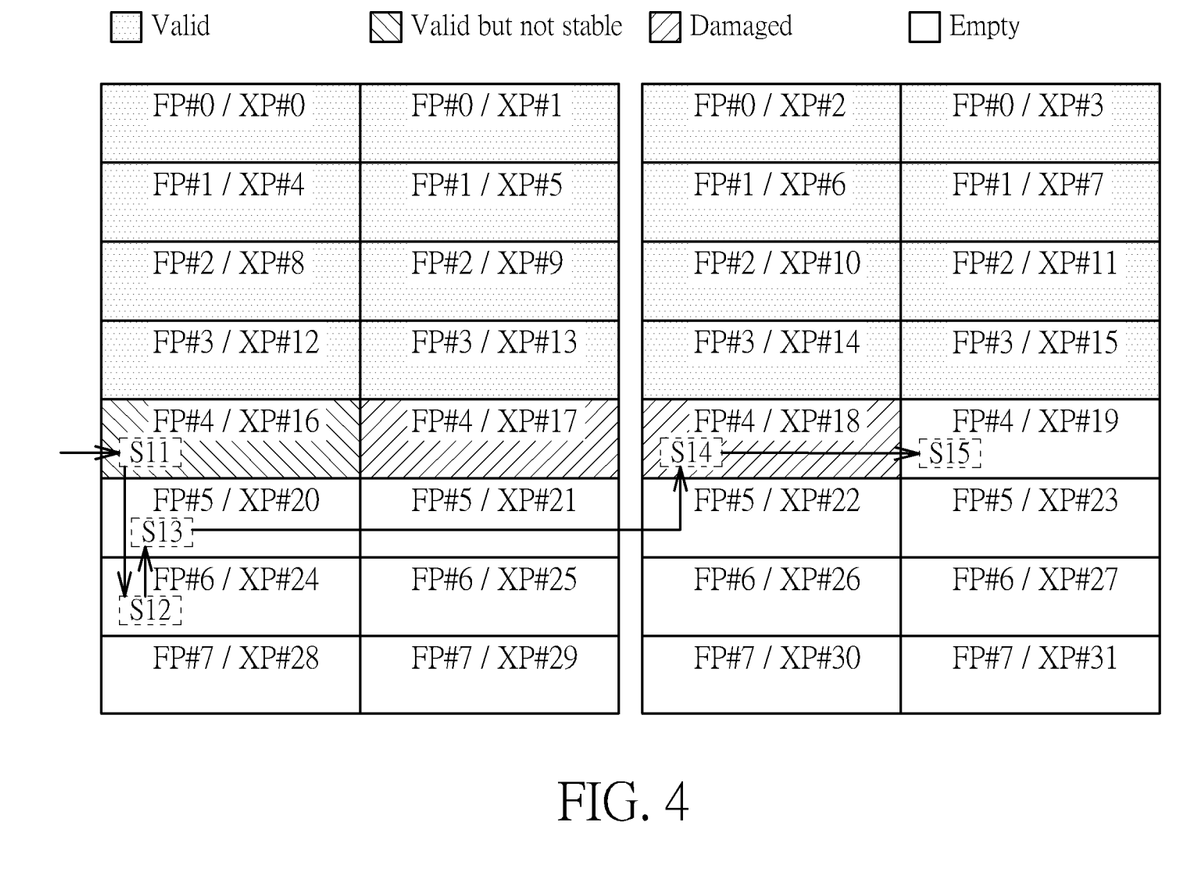
FIG. 4 illustrates some reading operations of a first management scheme of the method shown in FIG. 3 according to an embodiment of the present invention.
Figure 5:
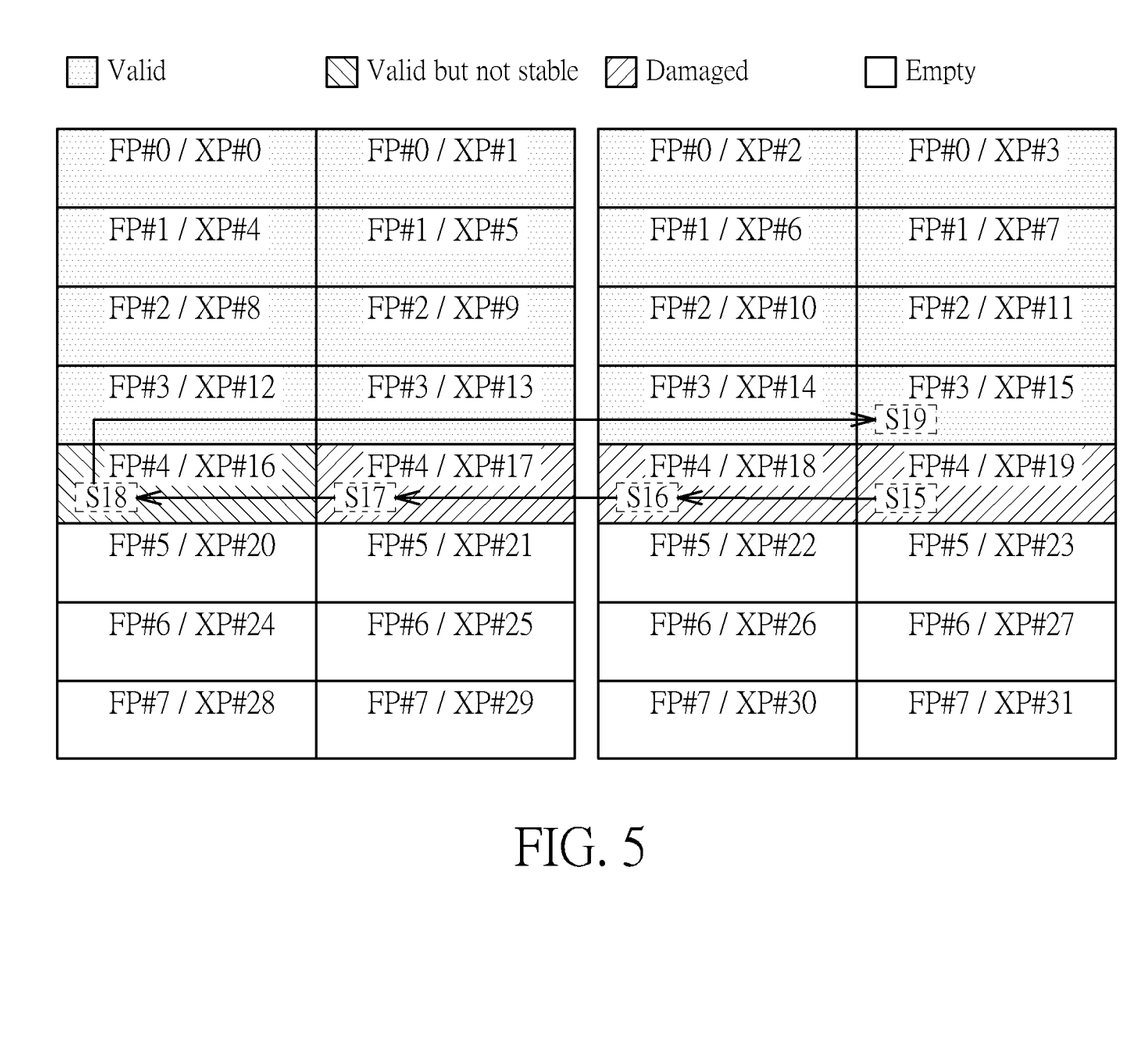
FIG. 5 illustrates other reading operations of the first management scheme.
Figure 6:
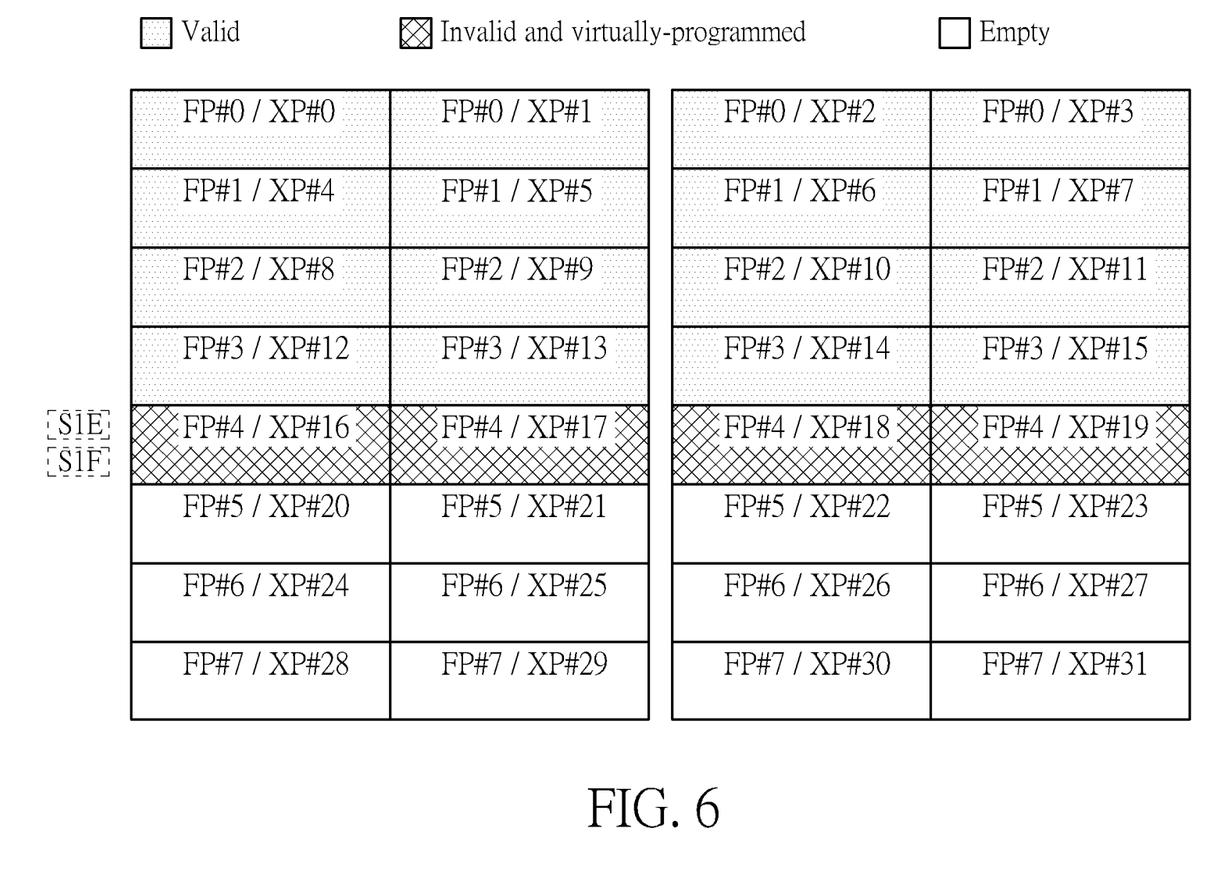
FIG. 6 illustrates some subsequent operations of the first management scheme.

FIG. 4 illustrates some reading operations of a first management scheme of the method shown in FIG. 3 according to an embodiment of the present invention (e.g. the respective reading operations of Steps S11, S12, S13, S14 and S15), FIG. 5 illustrates other reading operations of the first management scheme (e.g. the respective reading operations of Steps S16, S17, S18 and S19), and FIG. 6 illustrates some subsequent operations of the first management scheme (e.g. the respective operations of Steps S1E and S1F). For better comprehension, assume that in the workflow 200 (more particularly, Step 210), the memory controller 110 may select the expansion block mentioned in Step 202 as the target block, but the present invention is not limited thereto. In this situation, the target block may represent the expansion block, the page count NP may represent the number Nxp of the expansion pages XP #0, XP #1, . . . and XP #(Nxp−1) within the expansion block, such as the expansion page count 32 of the expansion pages XP #0, XP #1, . . . and XP #31 in this embodiment, and the start page number SP may equal to 0.

For example, the memory controller 110 may perform the binary search on the target block such as the expansion block to find the first empty page in the expansion block, and more particularly, may sequentially perform reading operations in Steps S11, S12 . . . and S15 (e.g. read five times in total during these operations) to determine that the expansion page XP #19 is the first empty page within the expansion block as shown in FIG. 4, where Steps S11, S12 . . . and S15 may be regarded as sub-steps of Step 212. Further, the memory controller 110 may perform the page-by-page search, starting from the first empty page in the backward direction within the target block such as the expansion block, to find the last valid page in the expansion block, and more particularly, may sequentially perform reading operations in Steps S16, S17 . . . and S19 (e.g. read four times in total during these operations) to determine that the expansion page XP #15 is the last valid page within the expansion block as shown in FIG. 5, where Steps S16, S17 . . . and S19 may be regarded as sub-steps of Step 216. As a result, the memory controller 110 performs reading operations for nine times in total in Steps S11, S12 . . . and S19. In addition, the operations of Step S1E and S1F may be equivalent to that of Steps 220 and 222, respectively, and may make the expansion pages XP #16, XP #17, XP #18 and XP #19 become invalid and dummy programmed. For brevity, similar descriptions for this embodiment are not repeated in detail here.

Figure 7:
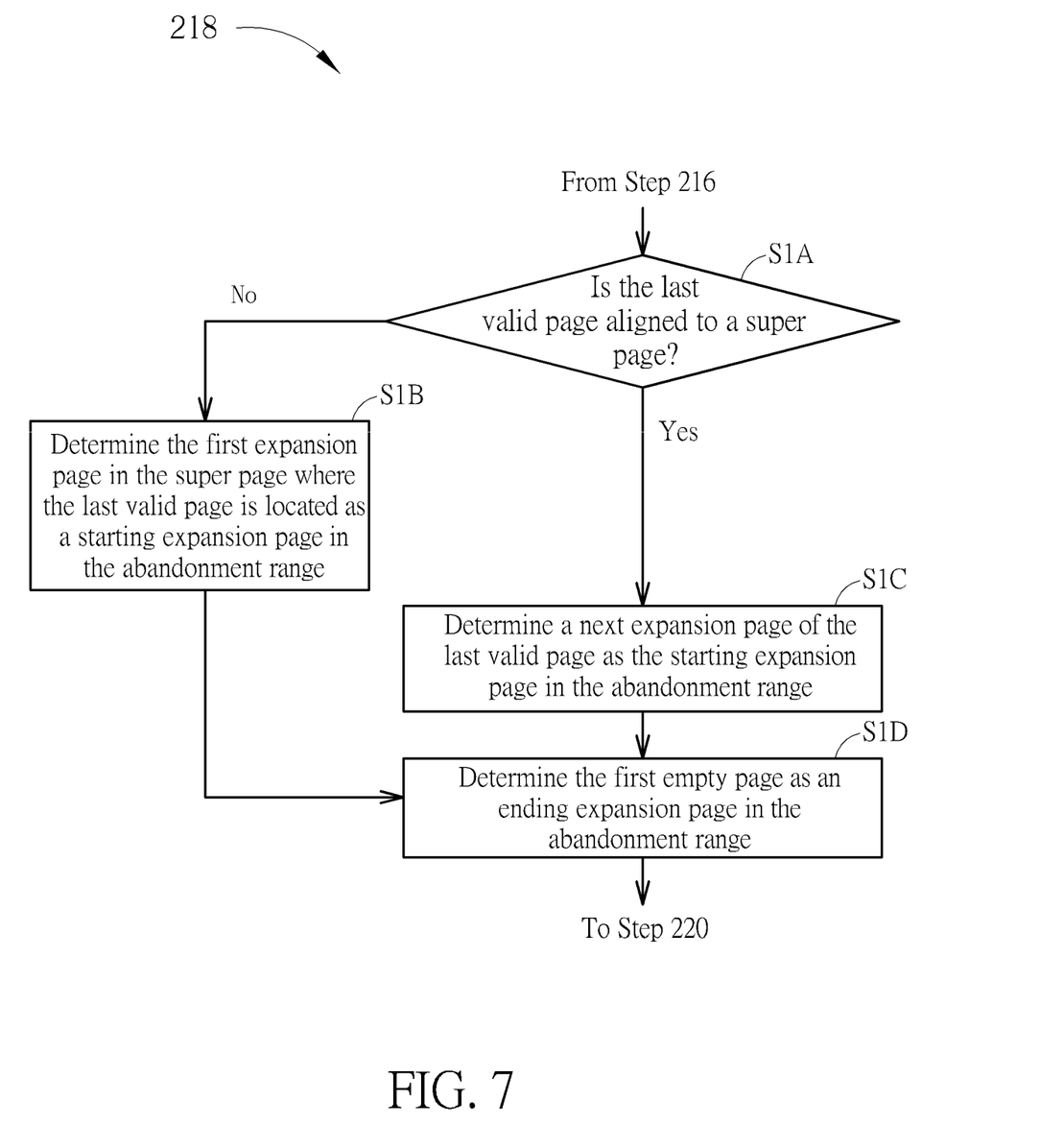
FIG. 7 illustrates some implementation details of the first management scheme.

FIG. 7 illustrates some implementation details of the first management scheme, where Steps S1A, S1B, S1C and S1D may be regarded as sub-steps of Step 218, but the present invention is not limited thereto.

In Step S1A, the memory controller 110 may check whether the last valid page (in the target block such as the expansion block) is aligned to a super page (e.g., whether the last valid page is located at the last expansion page of the super page), such as the super page comprising the last valid page, i.e. the super page where the last valid page is. If the last valid page is aligned to the super page (e.g., the last valid page is located at the last expansion page of the super page), Step S1C is entered; otherwise, Step S1B is entered.

In Step S1B, the memory controller 110 may determine the first expansion page in the super page where the last valid page (in the target block such as the expansion block) is located to be a start expansion page in the abandonment range.

In Step S1C, the memory controller 110 may determine the next expansion page of the last valid page (in the target block such as the expansion block) to be the start expansion page in the abandonment range.

In Step S1D, the memory controller 110 may determine the first empty page (in the target block such as the expansion block) to be an end expansion page in the abandonment range. For brevity, similar descriptions for this embodiment are not repeated in detail here.

Figure 8:
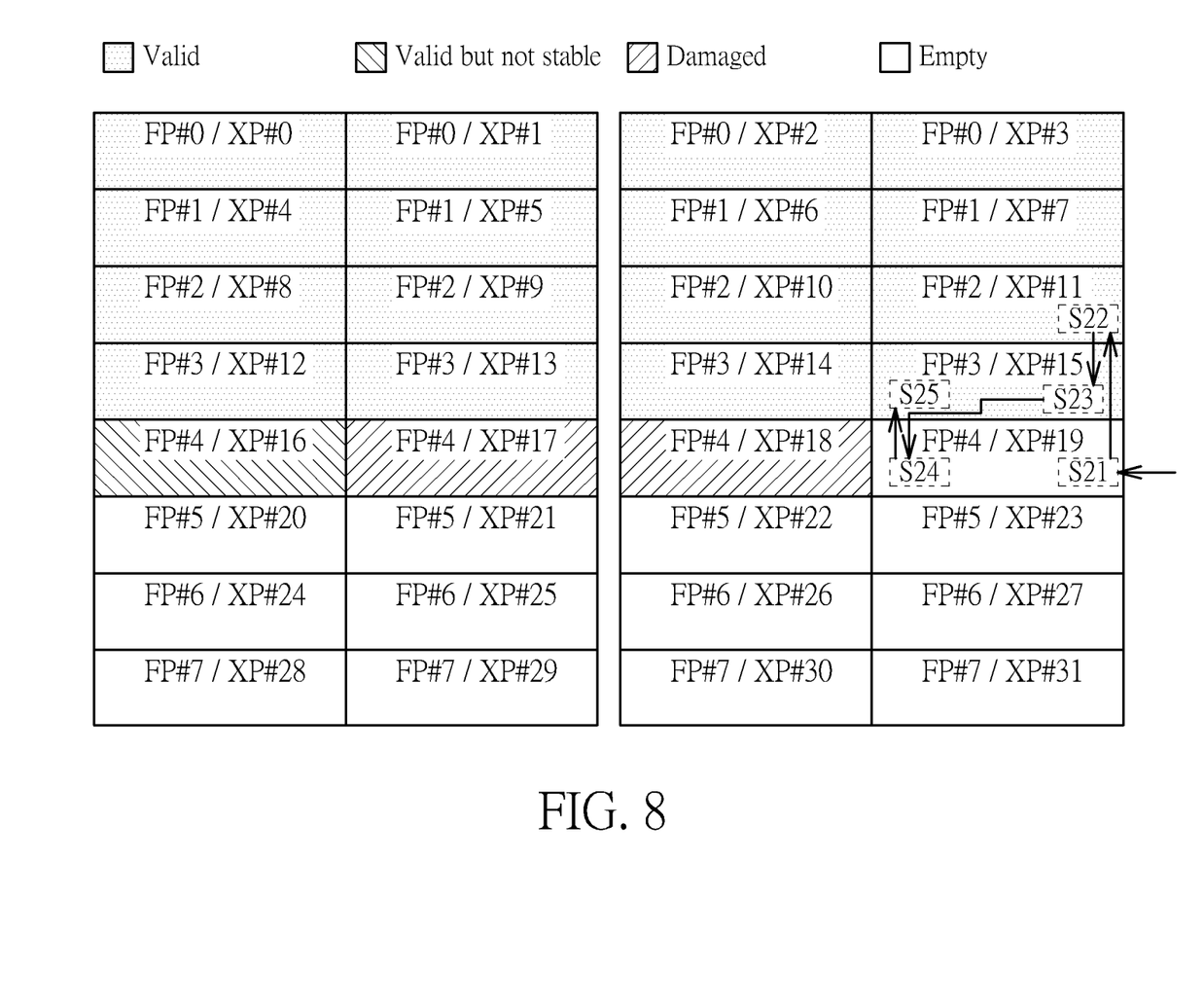
FIG. 8 illustrates some reading operations of a second management scheme of the method shown in FIG. 3 according to an embodiment of the present invention.
Figure 9:
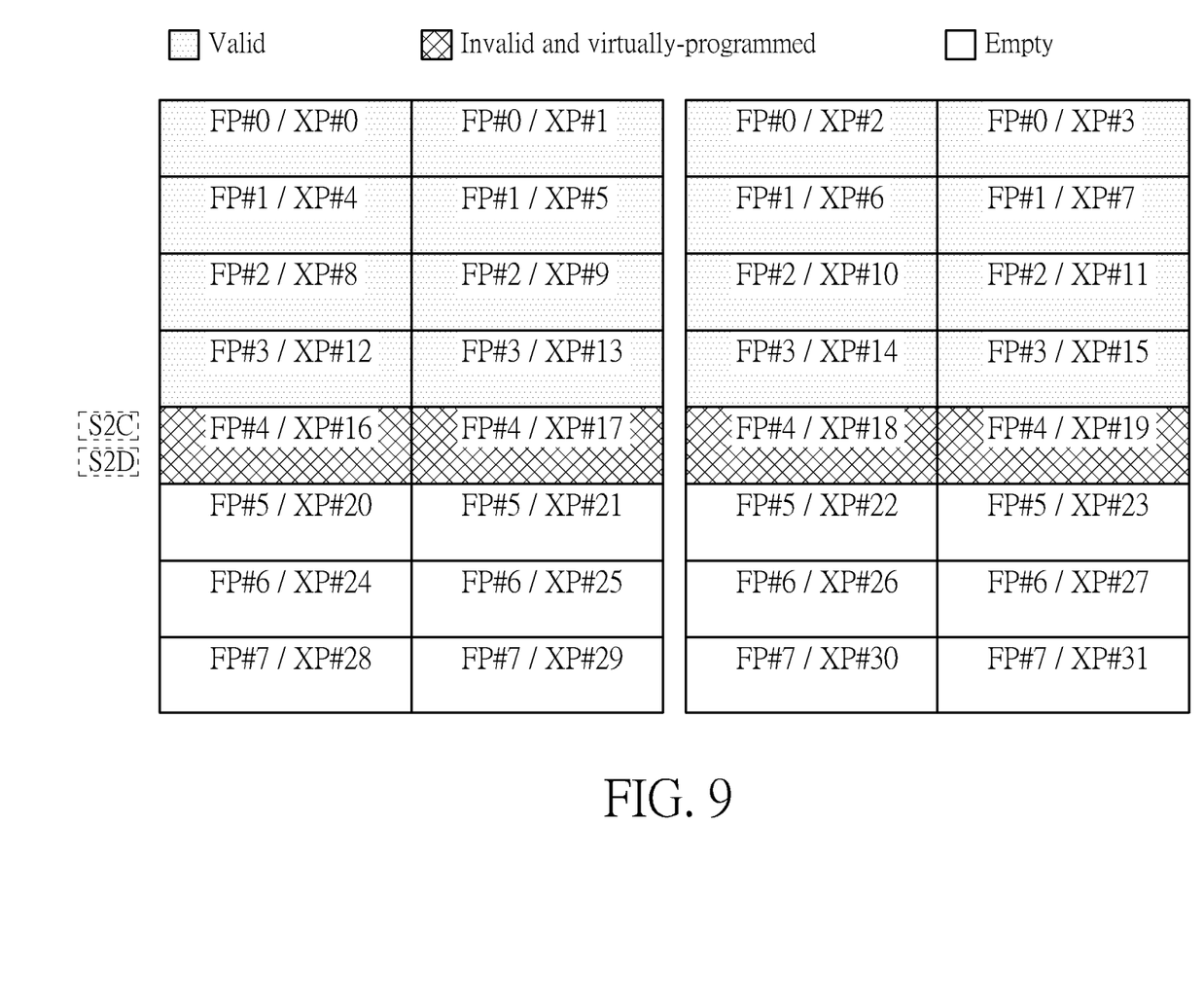
FIG. 9 illustrates some subsequent operations of the second management scheme.

FIG. 8 illustrates some reading operations of a second management scheme of the method shown in FIG. 3 according to an embodiment of the present invention (e.g. respective reading operations of Steps S21, S22, S23, S24 and S25), and FIG. 9 illustrates some subsequent operations of the second management scheme (e.g. respective operations of Steps S2C and S2D). In comparison with the first management scheme, the second management scheme may further improve the performance of the memory device 100. For example, in the workflow 200 (more particularly, Step 210), the memory controller 110 may select the last physical block among the corresponding physical blocks that are associated with one another to form the expansion block mentioned in Step 202, such as the physical block belonging to the plane PL #1 of the die DIE #1 in the aforementioned four corresponding physical blocks, as the target block, but the present invention is not limited thereto. In this situation, the target block may represent the last physical block, and the page count NP may represent the number Nfp of the physical pages FP #0, FP #1, . . . and FP #(Nfp−1) in the last physical block, such as the physical page count 8 of the physical pages FP #0, FP #1, . . . and FP #7 in this embodiment, and the start page number SP may equal to 0.

For example, the memory controller 110 may perform the binary searching on the target block such as the last physical block to find the first empty page in the last physical block, and more particularly, may sequentially perform reading operations in Steps S21, S22 . . . and S24 (e.g. read four times in total during these operations) to determine that the physical page FP #4 in the last physical block (i.e. the physical page which equals to the expansion page XP #19) is the first empty page in the last physical block as shown in FIG. 8, where Steps S21, S22 . . . and S24 may be regarded as sub-steps of Step 212. Further, the memory controller 110 may perform the page-by-page search, starting from the first empty page in the backward direction within the target block such as the last physical block, to find the last valid page in the last physical block, and more particularly, may perform a reading operation in Step S25 (e.g. read once in total during this operation) to determine that the physical page FP #3 in the last physical block (i.e. the physical page which equals to the expansion page XP #15) is the last valid page in the last physical block as shown in FIG. 8, where Step S25 may be taken as an example of Step 216. As a result, the memory controller 110 performs reading operations for five times in total in Steps S21, S22 . . . and S25. In addition, the operations of Step S2C and S2D may be equivalent to that of Steps 220 and 222, respectively, and may make the expansion pages XP #16, XP #17, XP #18 and XP #19 become invalid and dummy programmed. For brevity, similar descriptions for this embodiment are not repeated in detail here.

Figure 10:
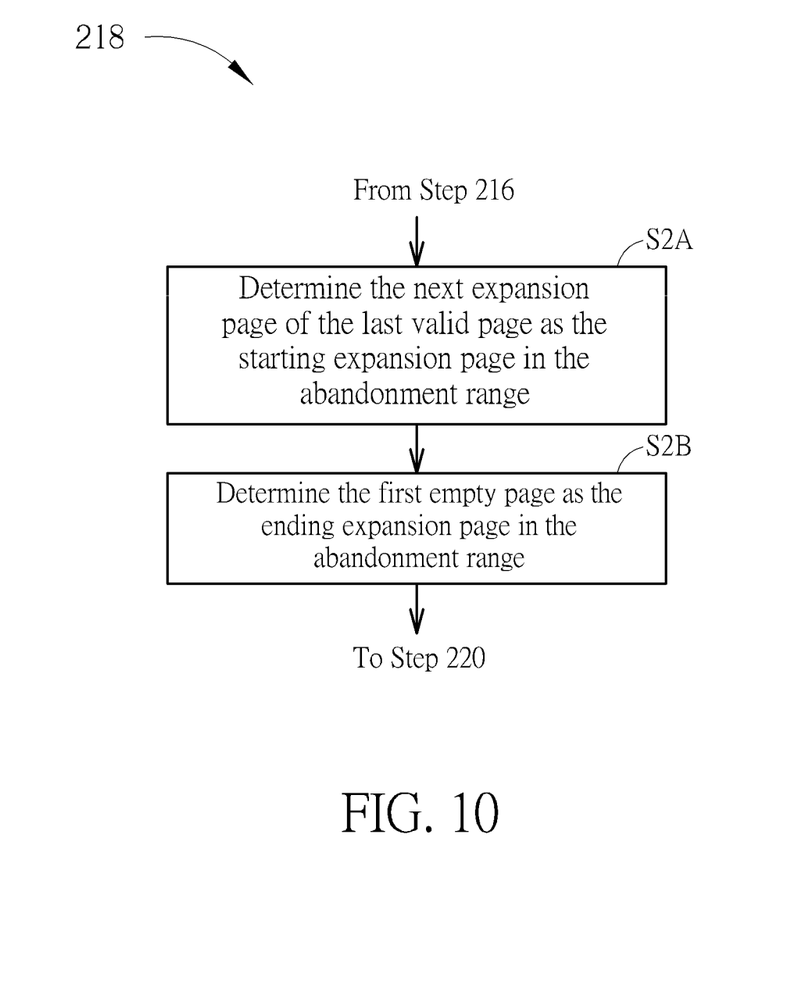
FIG. 10 illustrates some implementation details of the second management scheme.

FIG. 10 illustrates some implementation details of the second management scheme, where Steps S2A and S2B may be regarded as sub-steps of Step 218, but the present invention is not limited thereto.

In Step S2A, the memory controller 110 may determine the next expansion page of the last valid page (in the target block such as the last physical block) to be the start expansion page in the abandonment range. For example, the last valid page within the last physical block may be the physical page FP #3 within the last physical block, i.e. the expansion page XP #15, and therefore the next expansion page of the last valid page in the last physical block is the expansion page XP #16.

In Step S2B, the memory controller 110 may determine the first empty page (in the target block such as the last physical block) to be the end expansion page in the abandonment range. For example, the first empty page in the last physical block may be the physical page FP #4 within the last physical block, i.e. the expansion page XP #19.

For brevity, similar descriptions for this embodiment are not repeated in detail here.

In the above embodiments, the last physical block may represent the physical block among the aforementioned corresponding physical blocks (e.g. the corresponding physical blocks that are associated with one another to form the expansion block mentioned in Step 202) that has the maximum die number and the maximum plane number, such as a physical block belonging to the plane PL #1 of the die DIE #1 within the aforementioned four corresponding physical blocks, but the present invention is not limited thereto. In some embodiments, the last physical block may represent the physical block among the aforementioned corresponding physical blocks (e.g. the corresponding physical blocks that are associated with one another to form the expansion block mentioned in Step 202) that is arranged to store the respective last sets of data of respective super pages of the expansion block. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing sudden power off recovery (SPOR) management, the method being applied to a memory device, the memory device comprising a non-volatile (NV) memory, the NV memory comprising at least one NV memory element, and the method comprising:

triggering writing an expansion block, wherein the memory device associates multiple physical blocks within a plurality of blocks of the at least one NV memory element with each other to form the expansion block, wherein during writing the expansion block, a sudden power off (SPO) event occurs, and the memory device is powered on again;

regarding a target block, setting a page count and a start page number for being processed with binary search;

at least according to the page count and the start page number, performing the binary search on the target block to find a first empty page within the target block;

regarding the target block, checking whether an abandonment condition is satisfied or whether the target block is full or empty, wherein whether the abandonment condition is satisfied is determined according to whether a page number of the first empty page within the target block is less than a first threshold;

in response to the abandonment condition being not satisfied and the target block being neither full nor empty, performing page-by-page search, starting from the first empty page in a backward direction within the target block, to find a last valid page within the target block, wherein the target block represents the expansion block, the first empty page within the target block represents a first empty page within the expansion block, and the last valid page represents a last valid page within the expansion block;

determining an abandonment range within the expansion block according to the last valid page and the first empty page, wherein determining the abandonment range within the expansion block according to the last valid page and the first empty page comprises:

checking whether the last valid page within the expansion block is aligned to a super page;

performing a determining operation, comprising:

in response to the last valid page within the expansion block being aligned to the super page, determining a next expansion page of the last valid page within the expansion block to be a start expansion page within the abandonment range; or in response to the last valid page within the expansion block being not aligned to the super page, determining a first expansion page in the super page where the last valid page within the expansion block is located to be a start expansion page within the abandonment range; and determining the first empty page within the expansion block to be an end expansion page within the abandonment range; and performing dummy programming on all expansion pages within the abandonment range.

2. The method of claim 1, wherein the at least one NV memory element comprises a plurality of NV memory elements, each NV memory element among the plurality of NV memory elements comprises multiple planes, and each plane among the multiple planes comprises multiple blocks; and the multiple physical blocks represent physical blocks respectively belonging to respective planes of the NV memory elements.

3. The method of claim 2, wherein the plurality of NV memory elements are a plurality of memory dies, respectively.

4. The method of claim 1, further comprising:

within a physical-to-logical address mapping table, recording any entry corresponding to the abandonment range as an invalid tag, to invalidate any expansion page within the abandonment range.

5. A memory device, comprising:

a non-volatile (NV) memory, arranged to store information, wherein the NV memory comprises at least one NV memory element; and a controller, coupled to the NV memory, the controller arranged to control operations of the memory device, wherein the controller comprises:

a processing circuit, arranged to control the controller according to a plurality of host commands from a host device, to allow the host device to access the NV memory via the controller, wherein:

the controller triggers writing an expansion block, and the controller associates multiple physical blocks within a plurality of blocks of the at least one NV memory element with each other to form the expansion block, wherein during writing the expansion block, a sudden power off (SPO) event occurs, and the memory device is powered on again;

regarding a target block, the controller sets a page count and a start page number for being processed with binary search;

at least according to the page count and the start page number, the controller performs the binary search on the target block to find a first empty page within the target block;

regarding the target block, the controller checks whether an abandonment condition is satisfied or whether the target block is full or empty, wherein whether the abandonment condition is satisfied is determined according to whether a page number of the first empty page within the target block is less than a first threshold;

in response to the abandonment condition being not satisfied and the target block being neither full nor empty, the controller performs page-by-page search, starting from the first empty page in a backward direction within the target block, to find a last valid page within the target block, wherein the target block represents the expansion block, the first empty page within the target block represents a first empty page within the expansion block, and the last valid page represents a last valid page within the expansion block;

the controller determines an abandonment range within the expansion block according to the last valid page and the first empty page, wherein:

the controller checks whether the last valid page within the expansion block is aligned to a super page;

according to whether the last valid page within the expansion block is aligned to the super page, the controller selectively determines a next expansion page of the last valid page within the expansion block to be a start expansion page within the abandonment range, wherein if the last valid page within the expansion block is aligned to the super page, the controller determines the next expansion page of the last valid page within the expansion block to be the start expansion page within the abandonment range, otherwise, the controller determines an expansion page in the super page where the last valid page within the expansion block is located to be the start expansion page within the abandonment range; and the controller determines the first empty page within the expansion block to be an end expansion page within the abandonment range; and the controller performs dummy programming on all expansion pages within the abandonment range.

6. The memory device of claim 5, wherein the expansion page in the super page where the last valid page within the expansion block is located represents a first expansion page within the super page where the last valid page within the expansion block is located.

7. The memory device of claim 5, wherein the at least one NV memory element comprises a plurality of NV memory elements, each NV memory element among the plurality of NV memory elements comprises multiple planes, and each plane among the multiple planes comprises multiple blocks; the multiple physical blocks represent physical blocks respectively belonging to respective planes of the NV memory elements; and the plurality of NV memory elements are a plurality of memory dies, respectively.

8. An electronic device comprising the memory device of claim 5, further comprising:
- the host device, coupled to the memory device, wherein the host device comprises:
  - at least one processor, arranged to control operations of the host device; and
  - a power supply circuit, coupled to the at least one processor, the power supply circuit arranged to provide power to the at least one processor and the memory device;
- wherein the memory device provides storage space to the host device.

9. A controller of a memory device, the memory device comprising the controller and a non-volatile (NV) memory, the NV memory comprising at least one NV memory element, and the controller comprising:
- a processing circuit, arranged to control the controller according to a plurality of host commands from a host device, to allow the host device to access the NV memory via the controller, wherein:
  - the controller triggers writing an expansion block, and the controller associates multiple physical blocks within a plurality of blocks of the at least one NV memory element with each other to form the expansion block, wherein during writing the expansion block, a sudden power off (SPO) event occurs, and the memory device is powered on again;
  - regarding a target block, the controller sets a page count and a start page number for being processed with binary search;
  - at least according to the page count and the start page number, the controller performs the binary search on the target block to find a first empty page within the target block;
  - regarding the target block, the controller checks whether an abandonment condition is satisfied or whether the target block is full or empty, wherein whether the abandonment condition is satisfied is determined according to whether a page number of the first empty page within the target block is less than a first threshold;
  - in response to the abandonment condition being not satisfied and the target block being neither full nor empty, the controller performs page-by-page search, starting from the first empty page in a backward direction within the target block, to find a last valid page within the target block, wherein the target block represents the expansion block, the first empty page within the target block represents a first empty page within the expansion block, and the last valid page represents a last valid page within the expansion block;
- the controller determines an abandonment range within the expansion block according to the last valid page and the first empty page, wherein:
  - the controller checks whether the last valid page within the expansion block is aligned to a super page;
  - according to whether the last valid page within the expansion block is aligned to the super page, the controller selectively determines a next expansion page of the last valid page within the expansion block to be a start expansion page within the abandonment range, wherein if the last valid page within the expansion block is aligned to the super page, the controller determines the next expansion page of the last valid page within the expansion block to be the start expansion page within the abandonment range, otherwise, the controller determines an expansion page in the super page where the last valid page within the expansion block is located to be the start expansion page within the abandonment range; and
  - the controller determines the first empty page within the expansion block to be an end expansion page within the abandonment range; and
- the controller performs dummy programming on all expansion pages within the abandonment range.

\* \* \* \* \*